UNITED STATES PATENT OFFICE.

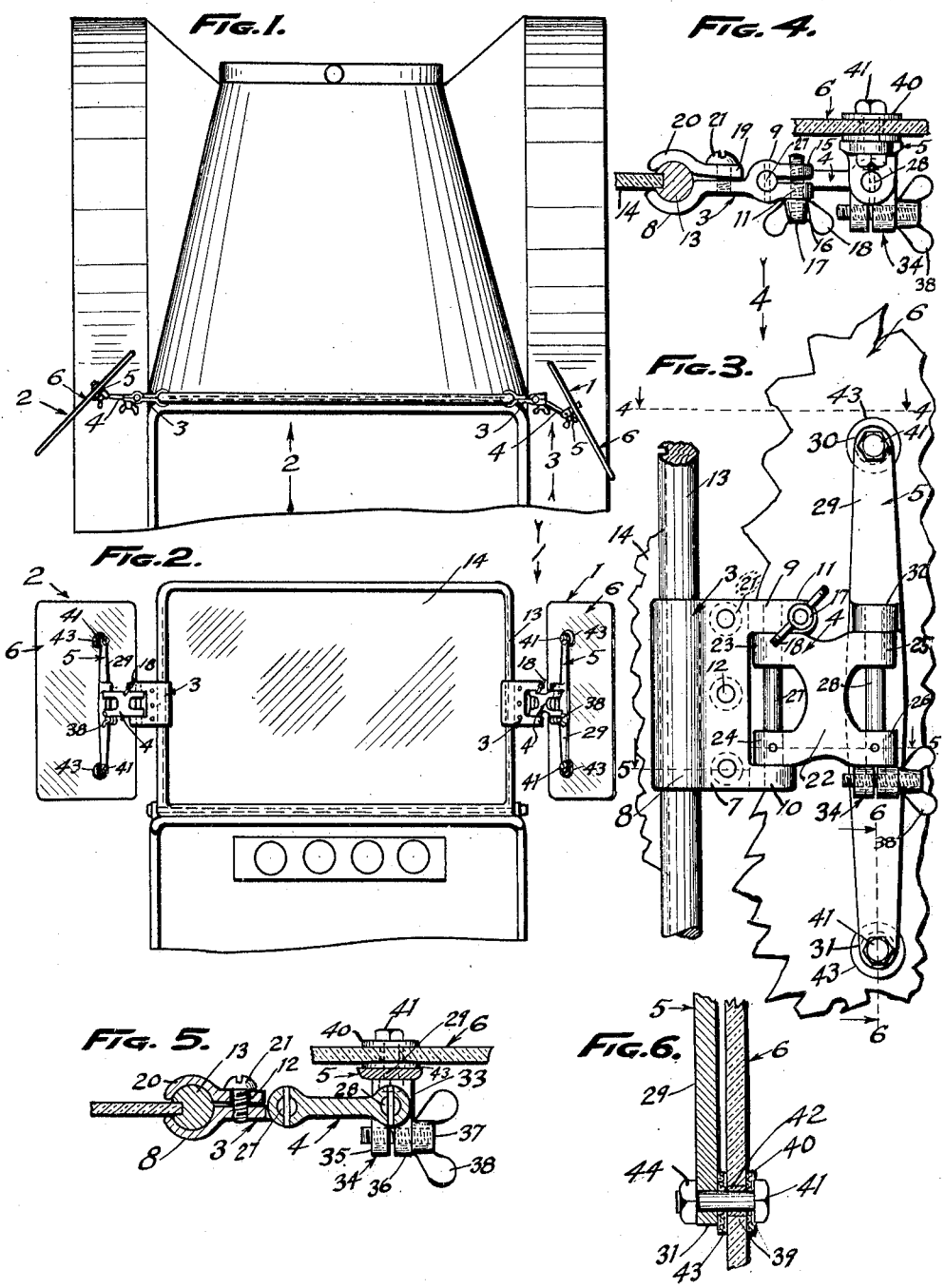

GEORGE GLAUDEL, OF LOS ANGELES, CALIFORNIA, ASSIGNOR OF ONE-HALF TO GEORGE L. MITCHELL, OF SANTA MONICA, CALIFORNIA.

AUXILIARY WINDSHIELD.

1,393,681.  Specification of Letters Patent.  Patented Oct. 11, 1921.

Application filed April 3, 1919. Serial No. 287,190.

*To all whom it may concern:*

Be it known that I, GEORGE GLAUDEL, a citizen of France, residing at Los Angeles, in the county of Los Angeles and State of California, have invented new and useful Improvements in Auxiliary Windshields, of which the following is a specification.

My invention relates to auxiliary wind shields, and consists of the novel features herein shown, described and claimed.

Figure 1 is a top plan view of the forward end of an automobile provided with auxiliary wind shields in accordance with the principles of my invention, the view being taken looking in the direction indicated by the arrow 1 in Fig. 2.

Fig. 2 is a fragmentary rear elevation looking in the direction indicated by the arrow 2 in Fig. 1.

Fig. 3 is an enlarged fragmentary detail of one of the auxiliary wind shields as seen looking in the direction indicated by the arrow 3 in Fig. 1 and upon the same plane as Fig. 2.

Fig. 4 is a fragmentary horizontal section on the line 4—4 of Fig. 3 and looking downwardly as indicated by the arrows.

Fig. 5 is a fragmentary horizontal section on the line 5—5 of Fig. 3.

Fig. 6 is a fragmentary vertical section on the line 6—6 of Fig. 3.

The auxiliary wind shields 1 and 2 are substantially alike except that they are made right and left.

The auxiliary wind shield 1 comprises a main clamp 3, a locking link 4 connected to the main clamp 3, an attaching plate construction 5 connected to the opposite end of the link 4 from the main clamp 3, and a wind shield plate 6 connected to the attaching plate construction 5.

The details of the main clamp 3 are as follows:

The main plate 7 is formed integral with the clamping jaw 8 the bearings 9 and 10 and the bearing clamp 11, and the plate 7 has a plurality of tapped holes 12. The jaw 8 is substantially semicircular in a top plan or edge view and is adapted to fit one side of the frame 13 of the main wind shield without engaging the glass 14. The bearings 9 and 10 are in vertical alinement and the bearing 9 is split and ears 15 and 16 extend from the bearing 9 one on each side of the split. The clamping screw 17 is inserted loosely through the ear 16 and tapped through the ear 15 and has a wing head 18. The secondary clamping plate 19 fits against the main plate 7 and has a clamping jaw 20 adapted to fit the other side of the wind shield frame 13 from the jaw 8. Cap screws 21 are inserted through the secondary clamping plate 19 into the tapped holes 12 to clamp the plate 7 and 19 together to clamp the jaws 8 and 20 upon the wind shield frame 13, so as to hold the main clamp 3 rigidly in an adjusted position relative to the main wind shield.

The details of the locking link 4 are as follows:

The body 22 is formed integral with alined bearings 23 and 24 extending one way and alined bearings 25 and 26 extending the other way. Hinge pins 27 and 28 are mounted in the bearings 23 and 24 and 25 and 26 respectively and fixed in place by retaining pins inserted through the bearings and through the hinge pins. The bearings 23 and 24 fit between the bearings 9 and 10 and the ends of the hinge pin 27 extend loosely into the bearings 9 and 10 and fit, so that when the wing head 18 is operated to tighten the bearing clamp 11 the pin 27 will be gripped and held from rotation as required to hold the link 22 stiff in an adjusted position relative to the main clamp 3.

The details of the attaching plate construction 5 are as follows:

The supporting bar 29 is of considerable length and has bolt bearings 30 and 31 at its ends, and hinge pin bearings 32 and 33 equal distances each side of the center, and a bearing clamp 34 extending from the hinge pin bearing 33. The bearing 33 is split and ears 35 and 36 extend from the bearing on opposite sides of the split. A clamping screw 37 is inserted loosely through the ear 36 and tapped through the ear 35 and has a wing head 38. The ears 25 and 26 fit between the bearings 32 and 33, and the ends of the hinge pin 28 fit loosely in the bearings 23 and 33, so that when the wing head 38 is operated to tighten the bearing 33 the hinge pin is held from rotation in the bearing as required to make the attaching plate construction stiff with the link 22 in an adjusted position.

The details of the wind shield plate 6 are as follows:

The plate 6 is preferably a heavy rectangular piece of glass and large holes 39 are bored through the plate in alinement with the holes in the bolt bearings 30 and 31. Felt washers 40 are applied to bolts 41 against their heads, sections 42 of rubber tubing are applied to the bolts against the felt washers 40, and the bolts are inserted through the openings 39. Felt washers 43 are applied to the bolts against the plate 6, then the supporting bar 29 is applied with the bolt bearings 30 and 31 fitting upon the bolts 41 against the washers 43, and nuts 44 are applied to the bolts against the bolt bearings 30 and 31.

The auxiliary wind shields 1 and 2 thus constructed are adapted to swing outwardly from the main wind shield frame 13 and to be adjusted to various positions as required to make side shields for the occupants of the front seat of the automobile.

When the plate 6 has been properly adjusted up and down and to the proper angle and the clamps tightened the plate will remain rigid with the main wind shield.

Various changes may be made without departing from the spirit of my invention as claimed.

I claim:

1. An auxiliary windshield comprising a main clamp adapted to be adjustably mounted upon a side bar of a main windshield, a split clamping bearing upon said main clamp, an attaching plate construction, a split clamping bearing upon said attaching plate construction, a link pivoted at its respective ends in said split clamping bearings, and a plate connected to the attaching plate construction.

2. In an auxiliary wind shield, a main clamping plate, a jaw extending from the main clamping plate and adapted to fit one side of a wind shield frame, a solid bearing extending from the main clamping plate, a clamping bearing extending from the main clamping plate, a clamp screw for the clamping bearing, a link fitting between the bearings, a hinge pin fixed in the link and extending loosely into the bearings and adapted to be rigidly held by the clamping bearing, a second hinge pin fixed in the link, a supporting bar, bearings extending from the supporting bar the ends of the second hinge pin being loosely mounted in the bearings on said supporting bearing one of said bearings being a split bearing, and a clamping screw for operating the split bearing to hold the hinge pin to hold the supporting bar in an adjusted position relative to the link.

In testimony whereof I have signed my name to this specification.

GEORGE GLAUDEL.